United States Patent [19]

Spinoglio

[11] 4,204,386
[45] May 27, 1980

[54] MACHINE FOR CUTTING AND GATHERING VEGETABLES

[75] Inventor: Mario Spinoglio, Peronne, France

[73] Assignee: Societe Anonyme dite: Ets Bonduelle a Renescure, France

[21] Appl. No.: 930,712

[22] Filed: Aug. 3, 1978

[30] Foreign Application Priority Data

Apr. 24, 1978 [FR] France ............................. 78 13263

[51] Int. Cl.² .......................................... A01D 90/00
[52] U.S. Cl. ...................................... 56/14.4; 56/16.6; 56/344
[58] Field of Search .............................. 56/14.1–14.6, 56/13.9, 16.6, 341, 344–364, 15.4, 15.5, 14.7–14.9; 180/139, 136

[56] References Cited

U.S. PATENT DOCUMENTS

| | | | |
|---|---|---|---|
| 3,334,702 | 8/1967 | Granryd | 180/139 |
| 3,448,879 | 6/1969 | van der Lely | 56/345 |
| 3,771,673 | 11/1973 | Moeller | 56/346 |
| 3,812,661 | 5/1974 | Baker | 56/14.4 |
| 3,813,861 | 6/1974 | Wood | 56/344 |
| 3,822,534 | 7/1974 | Martin | 56/13.9 |
| 3,828,535 | 8/1974 | Lundahl | 56/344 |
| 3,845,608 | 11/1974 | Lueshen | 56/344 |
| 4,060,028 | 11/1977 | Luscombe | 56/344 |

FOREIGN PATENT DOCUMENTS 250843  1/1963  Australia ................................. 180/139

*Primary Examiner*—Jay N. Eskovitz
*Attorney, Agent, or Firm*—Robert E. Burns; Emmanuel J. Lobato; Bruce L. Adams

[57] ABSTRACT

The invention concerns a machine for cutting and gathering vegetables such as spinach, the machine consisting of a chassis having a wheeled front sub-chassis hinged to a wheeled rear sub-chassis about a vertical axis, means for varying the relative positions of the two sub-chassis around the axis, means carried by the front sub-chassis, for cutting and gathering a bucket for storage arranged on the rear sub-chassis, and a transporter device which joins the means for cutting and gathering to the bucket.

17 Claims, 2 Drawing Figures

MACHINE FOR CUTTING AND GATHERING VEGETABLES

FIELD OF INVENTION

The present invention relates to a machine for cutting and gathering vegetables, particularly but not exclusively spinach or other similar vegetables.

BACKGROUND OF THE INVENTION

At present, machines of small dimensions are used which maneuver in large numbers over the working area and which cut the product and bring it to a lorry or trailer parked at the side of the field. The small size of these machines means that they have to go backwards and forwards many times between the working area and the lorry or trailer, which has the double drawback of a loss of time and destruction of the product which remains on the field. The destruction of the remaining product is a particularly great drawback when, as is the case with spinach, it is harvested at two periods of the year, for example in the autumn and the spring. The abundance and quality of the second harvesting is dependent on the good condition of the product which remains on the field after the first harvesting.

Sometimes, in order to avoid these frequent backward and forward journeys, each of these small machines is accompanied by a tractor coupled to a trailer, which follows a parallel circuit at the same speed, in order to receive the product as it is gathered. The result of this is the doubling of the imprints on the ground, with, as an additional consequence, the destruction of the product which remains on the field.

In addition, the small harvesting machines used at present cannot operate in wet weather because they easily become stuck, all the more so in that their intensive journeyings rapidly transform the field into a quagmire, with the additional effect of accentuating the damaging effects on the product remaining in the field which have already been mentioned above.

This drawback, which is particularly serious if harvesting has to be carried out in the autumn when the ground is often wet, is particularly tiresome when the harvest must supply a processing system, for example, a canning industry, as the stoppage of the harvesting also stops the processing system making personnel idle.

SUMMARY OF THE INVENTION

The purpose of the present invention is to propose a new machine for harvesting and gathering which avoids the drawbacks referred to above. For this purpose, the invention proposes a machine of large dimensions which includes an intermediate storage space which makes it possible to extend the gathering time between two return journeys to the edge of the field in order to empty the machine, with the result that the maneuvers of this machine are reduced, and consequently there is a gain of time and less damage to the ground and to the product which remains thereon. The use of very wide tires of large diameter also contributes to this reduction of the damage to the ground and to the product which remains in the ground, the pressure applied to the ground by such tires remaining satisfactory in spite of the considerable weight of the machine and of its load. These tires also have the advantage that they penetrate less easily into wet soil than normal tires, which makes it possible to use the machine in all weathers, and consequently to guarantee continuous supply to a processing system of the harvested product.

The utilisation of the machine according to the invention makes it possible to reduce the damage to the ground and the product remaining on the latter to such a point that it becomes possible to contemplate a third annual harvest, for example, in the form of a second autumn harvest, when the product lends itself to this by its growing characteristics and by the method of its consumption, as is the case, for example, with spinach.

The embodiment of the machine according to the invention in an articulated form gives its a short steering radius, and, consequently great maneuverability, in spite of its large size.

Finally it must be noted that, according to a preferred embodiment, the adoption of a compressing device inside the storage area of the machine makes it possible to pile up the harvested product inside this space as desired, which considerably increases the possible load of this storage area, in spite of its limited volume, thus accentuating the advantages inherent in the presence of a provisional storage space directly on the machine.

The machine according to the invention, for harvesting and gathering of vegetables, is characterised in that it includes:

a chassis consisting of a front sub-chassis and a rear sub-chassis equipped with wheels and articulated together about a vertical axis, means for varying the relative direction of the two sub-chassis around the said axis, means for cutting and harvesting, carried by the front sub-chassis, a storage bucket arranged on the rear sub-chassis, a transporter device which joins the means of cutting and gathering to the bucket.

BRIEF DESCRIPTION OF DRAWING

The invention will be better understood if reference is made to the description below and to the attached drawings which relate by way of example to one embodiment of the invention.

DESCRIPTION OF PREFERRED EMBODIMENT

Figure 1:
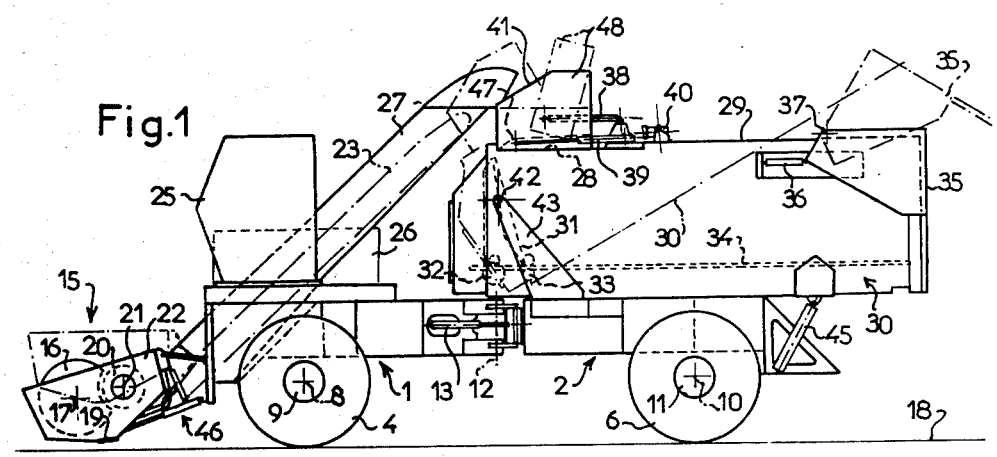
FIG. 1 shows a side view of a machine according to the invention.

The drawings show the machine in its operational position, the respective longitudinal directions of the front 1 and rear 2 sub-chassis coinciding in a single longitudinal direction 3.

The front sub-chassis 1 rests on the ground by means of two wheels 4 and 5 which are rotatable about a common axis 8 orientated laterally in relation to the longitudinal direction of the sub-chassis 1. The wheels 4, 5 are driven by a motor, for example hydraulic motor 9, which is itself arranged along the axis 8. Similarly the rear sub-chassis 2 rests on the ground by means of two wheels 6 and 7 which are rotatable about common axis 10 directed laterally in relation to the general direction of the sub-chassis 2. The wheels 6, 7 are driven by a hydraulic motor 11 which is itself arranged along the axis 10. The tires of the four wheels 4 to 7 have considerable width and diameter, for example, of the order of 1.10 m and 1.70 m respectively, so that, in spite of its considerable weight and the considerable load which it may receive, the machine does not apply excessive pressure to the ground. Tests carried out have shown that the pressure applied to the ground by a machine according to the invention which carries a load of the order of 4 tons does not exceed 1.5 kg per cm².

Figure 2:
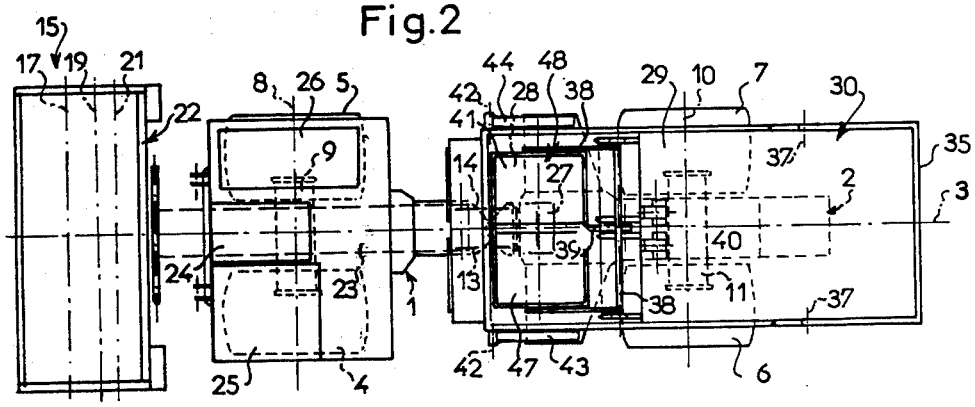
FIG. 2 shows a view of the machine of FIG. 1 from above.

In order to initiate a change of the orientation of the axis 8 of the front wheels in relation to the orientation of the axis 10 of the rear wheels, that is, to cause turning of the machine in relation to the position illustrated in which these axes 8 and 10 are parallel, the rear end of the sub-chassis 1 is articulated on to the front end of the rear sub-chassis 2 about a vertical axis 12 which is arranged at approximately equal distances from the axes 8 and 10, in a longitudinal vertical midplane of each of the sub-chassis 1 and 2. The change of direction is controlled by hydraulic actuators 13 and 14, shown diagrammatically by the dot-and-dash lines in FIG. 2, which are arranged on either side of the longitudinal vertical midplane of the sub-chassis 1. The actuators 13, 14 extend parallel to the longitudinal vertical midplane when the machine is in the position of linear movement illustrated. The body and stem of each of the actuators are articulated respectively on the sub-chassis 1 and the sub-chassis 2 about vertical axes situated on the same side in relation to the longitudinal vertical midplane of the sub-chassis so that, when one of the actuators is operated for thrust and the other for tractive force, the sub-chassis 1 pivots in relation to the sub-chassis 2 about the axis 12 in the direction of a mutual approach on the side of the actuator which operates with tractive force, with the result that the machine turns to this side.

At its front end, the front sub-chassis 1 has means for cutting and gathering 15 of a general design which is known in itself and which comprises, for example, from the front to the rear, a cutter drum 16 which is assembled for rotation about a horizontal lateral axis 17 in such a manner that its lower generator becomes flush with the level 18 of the ground when the machine is in the working position, a cutting knife 19 which consists, for example, of two lateral, horizontal toothed blades, arranged level with the ground in the working position of the machine and actuated by a lateral forward and backward movement, and two Archimedes screws 20 arranged respectively on either side of the longitudinal vertical midplane of the sub-chassis 1, and assembled for rotation about a common lateral horizontal axis 21, the pitch of these screws being inverted so that, when they are driven in rotation in the same direction, they bring towards the longitudinal vertical midplane of the sub-chassis 1 the products cut by the knives 19 after having been flattened by the drums 16.

An endless transporter extends approximately along the longitudinal vertical midplane of the sub-chassis 1 from a housing 22 located behind the means for cutting and gathering 15 described above. The endless transporter 23 ascends from the front to the rear, its lower end extending to the housing 22 and its upper end being situated approximately directly vertically above the axis 12 forming a hinge between the two sub-chassis.

The endless transporter 23, which is arranged along the longitudinal vertical midplane of the sub-chassis 1, crosses sub-chassis 1 via a space 24 on either side of which are arranged a driving cabin 25 of the machine and an engine and hydraulic pump unit 26 respectively. The unit 26 supplies the hydraulic motors 9 and 11 and the various actuators of the machine. The upper end of the endless transporter 23 emerges from a protective housing 27 above an opening 28 which is formed, approximately at right angles to the axis 12, by the upper side 29 of a closed bucket 30 carried by the rear sub-chassis 2. The bucket 30 is located in a position which is such that when loaded its centre of gravity, is located approximately vertically above the axis 10 of the wheels 6.

A device consisting of an apron 31 which occupies the whole of the interior lateral section of the bucket 30, a motor-reducer unit 32, and guiding pulleys 33 which engage on longitudinal toothed racks 34 inside the bucket 30 is movable at will longitudinally between the two ends of the bucket.

The apron 31 is shown in FIG. 1 in its rest position, where it is at the front end of the bucket 30 in front of the opening 28. The opening 28 consequently communicates with the whole of the internal volume of the bucket 30 into which the endless transporter 23 introduces the products cut and gathered by the unit 15. When the bucket 30 appears full, it is possible either to compress the product in it, or to empty it, by causing a longitudinal movement of the apron 31 from the front end of the bucket towards its rear end, if it is desired to compress the product, a door 35 closes the rear end of the bucket 30. If it is desired to empty the bucket, the door 35 is opened, for example by rotation upwards around a horizontal transverse axis 37 situated close to the upper face 29 of the bucket. The rotation is caused by actuators 36. When the apron 31 has been brought as close as possible to the rear end of the bucket 30, that is in the immediate proximity of the end when the door 35 is open to totally empty the bucket 30, or at a certain distance from the end if the door 35 is closed with interposing of the piled up product between the apron 31 and the door 35, the apron 31 stops moving towards the rear and returns, by a longitudinal movement, to the front end of the bucket 30, in front of the opening 28.

In both cases, means are provided for temporarily blocking the opening 28, and for gathering the product which the upper end of the endless transporter 23 continues to empty above this opening 28.

These means consists of a retractable basket 48 shown in the drawings in a position where its bottom 47 is superimposed on the hole 28 which it blocks.

The basket 48 is movable, by the action of hinged arms 38 and actuators 39 and 40, between the positions shown in full and dot-dash lines. In the position shown in full lines the botton 47 of the basket 48 blocks the opening 28 and the basket presents an open face 41 towards the top and the front, facing the upper end of the endless transporter 23. Through this open face 41 the endless transporter 23 empties the products which come out from the means of cutting and gathering 15 during the compacting or emptying of the product contained in the bucket 30. In the position shown diagrammatically in dot-dash lines, the basket 48 is rocked in such a manner that its bottom 47 is turned towards the rear of the machine and its open face 41 is turned towards the front and the bottom above the opening 28. The opening 28 is thus no longer obstructed and the products gathered by the basket 48 during the blocking of the opening 28 and the products which the endless transporter 23 continues to tip out are introduced through the opening 28 into the bucket 30.

In view of the relative positions occupied by the upper end of the endless transporter 23 and of the housing 27 and the opening 28 in relation to the axis 12, the upper end of the endless transporter 23 and of the housing 27 emerges above the opening 28 or the bottom 47 of the basket 48, when it is superposed on the opening 28, whatever the angle formed by the respective longitudinal directions of the two sub-chassis 1 and 2 within the limits permitted by the hinging about axis 12. Hence the machine can cut and gather the products and introduce them into the bucket 30 even when turning.

The machine illustrated as an example presents, moreover, a certain number of arrangements which are likely to increase its operational flexibility.

Hence, the means for cutting and gathering 15 are connected to the front of the front chassis 1 by means of a set of arms and of actuators 46 hinged around horizontal lateral axes in such a manner as to make possible the movement of the means of cutting and gathering 15 from the illustrated working position in which the lower generators of the cutting drum 16 and the cutters 19 are arranged level with the ground to a travelling position shown in dot-dash lines in which these elements are arranged at a higher level.

Another arrangement makes it possible to lift at least the rear end of the bucket in order that its contents may be discharged for example into a lorry container or a trailer over the upper side of the container or trailer. For this purpose, the front end of the bucket 30 is pivotal on the sub-chassis 2 about a horizontal axis 42 which is directed laterally in relation to the general direction of the sub-chassis 2. The axis 42 is defined by bearings carried by two lateral supports 43 and 44 extending upwards from the sub-chassis 2. The rear end of the bucket is connected to the sub-chassis 2 by means of an actuator 45, which is hinged respectively on the bucket and on the rear of the sub-chassis 2 about parallel horizontal axes extending perpendicular to the general direction of the sub-chassis 2. The actuator 45 acts to push the respective rear ends of the bucket and of the sub-chassis 2 apart in order to cause the rear part of the bucket to rise, the bucket pivoting about axis 42 from the position shown in full line in which it is approximately horizontal and rests by its lower face on the upper face of the chassis 2, to the position shown in dot-dash lines in which the rear end of the bucket is raised by a distance greater than the height of the bucket itself.

Various other accessory arrangements could naturally be adopted especially for increasing the convenience of use of the machine.

Moreover, the machine could have numerous variants in relation to the emodiment described and represented without, however, going outside the framework of the invention.

What is claimed is:

1. A machine for cutting and gathering vegetables, comprising:
    a chassis consisting of wheeled front and rear sub-chassis hinged together about a vertical axis;
    means for varying the relative direction of said two sub-chassis about said axis;
    means of cutting and gathering carried by said front sub-chassis;
    storage bucket arranged on said rear sub-chassis; and
    a transporter device extending from said means of cutting and gathering to said bucket;
    said bucket having an opening in its upper part and located approximately above said axis, and said transporter device ascending from said cutting and gathering means towards said bucket, the upper end of said transporter device being situated approximately above said axis and said opening.

2. A machine according to claim 1, comprising means for closing the opening in the bucket.

3. A machine according to claim 2, comprising means for gathering and storing cut and gathered vegetables when said opening of said bucket is closed.

4. A machine according to claim 3, in which said means for gathering and storing consist of a basket arranged above said opening, said basket having a closed bottom of dimensions at least equal to the dimensions of said openings, and means for moving said basket between a position where its bottom is superposed on said opening in order to close the opening and gather the vegetables, and a position in which said bottom is displaced from between said upper end of said transporter and said opening.

5. A machine according to claim 1, comprising means for compressing vegetables inside said bucket.

6. A machine according to claim 5, in which said means for compressing consist of a movable apron inside the bucket, and means for imparting a longitudinal movement to said apron from one end of said bucket towards the front in relation to said opening to the other end of said bucket towards the rear in relation to said opening.

7. A machine according to claim 1, comprising means of emptying said bucket.

8. A machine according to claim 6, comprising means for emptying said bucket.

9. A machine according to claim 8, in which said bucket consists of a door at its rear end and said means of emptying consist of said movable apron.

10. A machine according to claim 9, in which said door is articulated on said bucket about a horizontal axis situated in the upper part of said bucket.

11. A machine according to claim 9, in which said bucket is pivotal on said rear sub-chassis about a horizontal axis and is provided with means for causing the raising of its rear end.

12. A machine according to claim 1, in which machine driving controls and a propulsion unit are arranged on said front sub-chassis.

13. A machine according to claim 1, in which said means for cutting and gathering are arranged at the front end of said front sub-chassis.

14. A machine according to claim 12, in which said driving controls and said propulsion unit are arranged respectively on either side of said transporter device.

15. A machine according to claim 1, in which the centre of gravity of said bucket and of its load is situated approximately above the axis of the wheels of said rear sub-chassis.

16. A machine according to claim 1, in which the said axis of hinging between said two sub-chassis is situated approximately equidistant from the axes of their respective wheels.

17. A machine according to claim 1, comprising means for moving said means of cutting and gathering between a working position in immediate proximity to the level of the ground and a travelling position at a higher level.

* * * * *